Oct. 23, 1962 D. W. KERMODE 3,059,343
NON-GYROSCOPIC PRECISION INCLINOMETER
Filed March 15, 1960

*INVENTOR.*
DAVID WINSTON KERMODE
BY
W. O. Quesenberry
ATTORNEY.

3,059,343
Patented Oct. 23, 1962

3,059,343
NON-GYROSCOPIC PRECISION INCLINOMETER
David W. Kermode, 107 Arondo St., Ridgecrest, Calif.
Filed Mar. 15, 1960, Ser. No. 15,244
9 Claims. (Cl. 33—215)
(Granted under Title 35, U.S. Code (1952), sec. 266)

The invention herein described may be manufactured and used by or for the Government of the United States of America for governmental purposes without the payment of any royalties thereon or therefor.

The invention relates to precision inclinometers and in particular to highly sensitive energized support bearings for the rotatably mounted elements of the inclinometer.

Inclinometers of the unbalanced mass type utilize the plane of the earth's surface as a reference and the earth's gravitational attraction as the force acting upon the unbalanced mass. Inclination is determined by comparison between parts of the inclinometer fixed to a vehicle and the unbalanced mass parts that are free to rotate to maintain a reference perpendicular to the earth's surface. Prior to this invention, pendulums employing bearings were seriously limited in their measurement of small angular differences because of relatively large bearing starting torques. Bearing starting torques cause the pendulum to follow the angular change of the pendulum support axis and frame until the force and direction of the gravitational attraction has varied sufficiently to start the bearings in rotation. When pendulums having a small unbalanced mass are used, the bearing starting torque is proportionately large compared to the force acting upon the pendulum. This is especially detrimental to sensitivity and accuracy when it is necessary to measure small angular changes. Ball bearings are the most suitable bearing in many inclinometer applications since their starting torque is relatively low; however, it is not negligible and introduces considerable error in the measurement of small angular changes with an inclinometer having a small unbalanced mass.

The present invention overcomes these difficulties by nullifying the effect of the starting torques of the unbalanced mass support bearings. This is accomplished by rotatably oscillating the bearing race of each of the bearings which rotatably support the unbalanced mass. The force applied to the bearing race is equal to or slightly greater in each direction than the force necessary to start the race against the friction of the balls and other race. That is, the torque applied to the race is equal to or slightly greater than the starting torque. The torque is applied to the bearing race by means of a permanent magnet armature operatively connected therewith. The frame supports an alternating field disposed adjacent the armature whereby current flow in the field in one direction causes the lines of force of the field to interact with the lines of force of the armature which causes the bearing race to rotate an increment in one direction. Field current flow in the opposite direction reverses the direction of the field lines of force and causes the bearing race to rotate an increment in the opposite direction. This operation is repeated for each complete cycle of current flow through the field windings. The inertia of the moving parts makes it possible to use low order of magnitude frequencies which frequencies are readily available from standard equipment sources.

An object of the present invention is to provide an unbalanced mass type inclinometer that is of simple design, of rugged construction and is highly sensitive.

Another object is to provide an inclinometer that utilizes a small unbalanced mass and is highly sensitive to small angular changes.

Still another object is to provide an inclinometer in which the starting torques of the unbalanced mass support bearings are nullified.

Still another object is to provide an inclinometer in which the bearing races of the unbalanced mass support bearings are oscillated a small increment in opposite directions with a force equal to or slightly greater than the frictional force of the bearings.

Still another object is to provide an inclinometer in which the bearing races of the unbalanced mass support bearings are oscillated a small increment in opposite directions by means of the interaction between the lines of force of a plurality of permanent magnets disposed in the bearing races and an A.C. field disposed adjacent thereto.

Other objects and many of the attendant advantages of this invention will become readily appreciated as the same becomes better understood by reference to the following detailed description when considered in connection with the accompanying drawing wherein.

Figure 1:
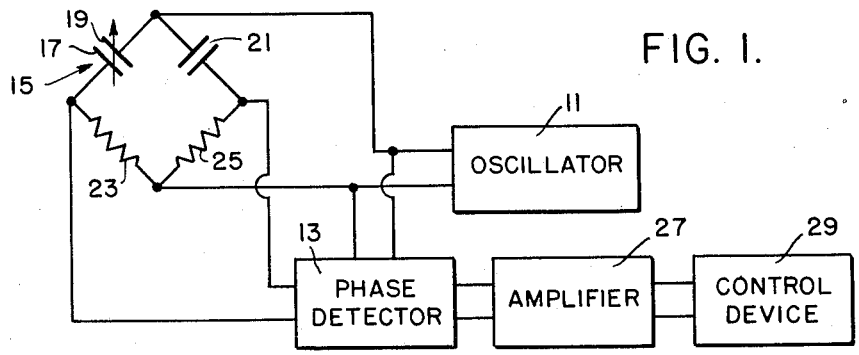
FIG. 1 is a diagrammatic view of a control system using the inclinometer of the present invention.
Figure 4:
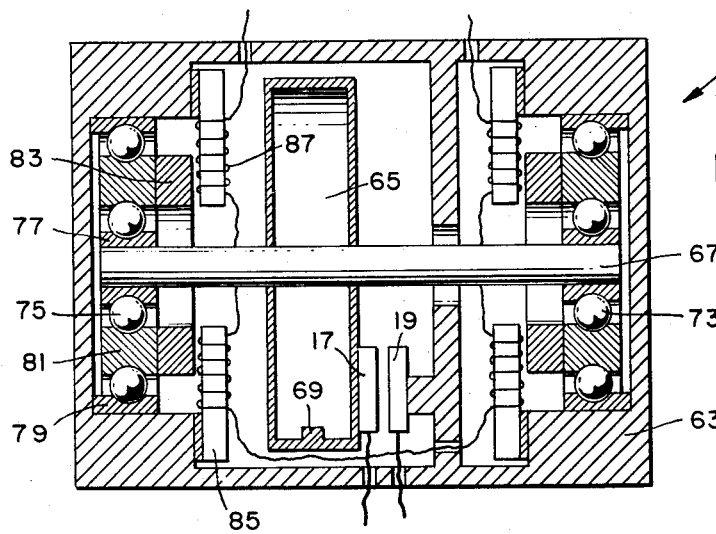
FIG. 4 is a sectional view showing a modification of the present invention.
Figures 2, 3:
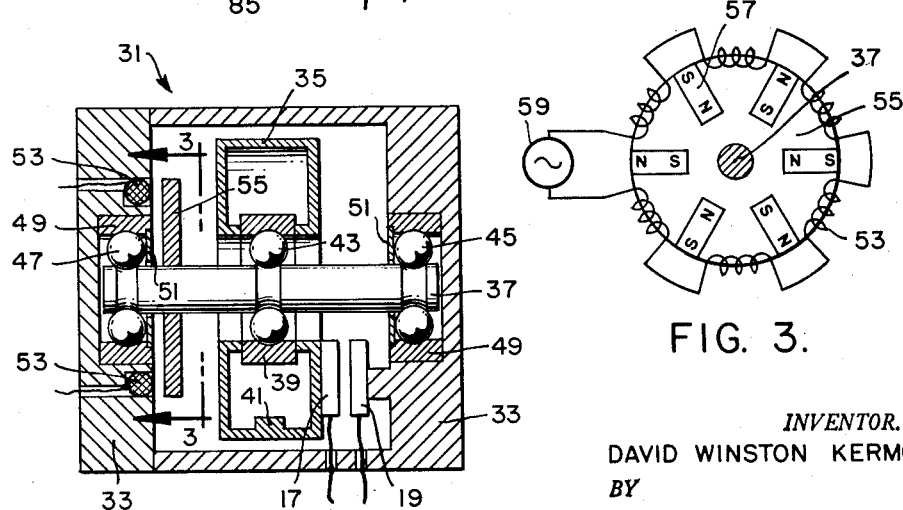
FIG. 2 is a sectional view of one form of the present invention.
FIG. 3 is a schematic view taken along line 3—3 of FIG. 2.

In FIG. 1 is shown a control system utilizing the variable capacitance of the inclinometers of FIGS. 2 and 4. The control system comprises an oscillator 11 the output of which is applied in parallel to a bridge circuit and to phase detector 13. One leg of the bridge circuit includes variable capacitor 15 which comprises capacitor plates 17 and 19 of FIGS. 2 and 4. The capacitance of variable capacitor 15 is changed by rotation of plate 17 with respect to plate 19 as shown in FIGS. 2 and 4. Another leg includes capacitor 21 the capacitance of which is matched to the capacitance of capacitor 15 when plates 17 and 19 are in zero reference position. Resistors 23 and 25 are provided in the other two legs of the bridge. Rotation of plate 17 in one direction from the zero reference position increases the capacitance of capacitor 15 and rotation in the other direction decreases the capacitance thus resulting in zero to 180° phase changes with relation to the output of oscillator 11. The output of the bridge network is applied to phase detector 13 and compared with the output of oscillator 11. The D.C. output of phase detector 13 is amplified by amplifier 27 and applied to control device 29.

In FIG. 2 is shown inclinometer 31 comprising a housing 33 and pendulum wheel 35 rotatably mounted on shaft 37 in the housing. Pendulum wheel 35 includes outer bearing race 39, capacitor plate 17, and unbalanced mass 41 and is rotatably mounted by means of bearing balls 43 on shaft 37 which functions both as a support and as an inner race for the bearing balls. Shaft 37 is rotatably mounted on housing 33 by means of ball bearings 45 and 47 each having an outer race 49, an inner race formed in shaft 37 and retainer rings 51. Field coils 53 are spaced circumferentially about outer race 49 and are exposed to the interior of housing 33 so that the A.C. magnetic field produced thereby extends into the cavity of housing 33. Circular armature 55 is fixedly mounted on shaft 37 and is adjacent field coils 53. The arrangement of armature 55 with relation to field coils is schematically illustrated in FIG. 3 wherein armature 55 includes a plurality of magnets 57, or magnetized sections, spaced at equal intervals about the periphery of the armature. Spaced from the plane surface of armature 55 and magnets 57 and disposed between the outer ends of adjacent magnets 57 are field coils 53 connected in series with A.C. power source 59. The A.C. current flow through series wound field coils 53 causes rotation of armature 55 an increment in one direction during the first half cycle and an increment in the other direction during the second half cycle. The magnetic force between the armature and field is equal to or slightly greater than the friction force of the bearings. Capacitor plate 19 is fixed to housing 33 and is spaced from and coextensive with capacitor plate 17 thereby forming capacitor 15 the capacitance of which is varied by rotation of capacitor plate 17 with respect to capacitor plate 19. The conductors connected to the capacitor plates are connected to the bridge circuit of FIG. 1.

In FIG. 4 is shown a modification of the inclinometer shown in FIG. 2. Inclinometer 61 comprises a housing 63, a pendulum wheel 65 which is disposed in the housing and fixedly mounted on shaft 67. Pendulum wheel 65 includes unbalanced mass 69 and capacitor plate 17. Shaft 67 is rotatably mounted on housing 63 by means of ball bearings 73 and 75. Each of these bearings is a bearing within a bearing having the inner race 77 fixedly attached to shaft 67, the outer race 79 fixedly to attached housing 63 and the center race 81 disposed therebetween and rotatably mounted on bearing balls. The center race also functions as an armature and includes a plurality of magnets 83, or magnetized sections, spaced at equal intervals about the periphery thereof. Spaced from the plane surface of center race 81 and magnets 83 and disposed between the outer ends of adjacent magnets 83 are a plurality of field winding cores 85 each having a winding 87 and connected in series with an A.C. power source in the same manner as shown in FIG. 3. Capacitor plate 19 is fixed to housing 63 and is spaced from and coextensive with capacitor plate 17 thereby forming capacitor 15 the capacitance of which is varied by rotation of capacitor plate 17 with respect to capacitor plate 19. The conductors connected to the capacitor plates are connected to the bridge circuit of FIG. 1.

Obviously many modifications and variations of the present invention are possible in the light of the above teachings. It is therefore to be understood that within the scope of the appended claims the invention may be practiced otherwise than as specifically described.

What is claimed is:

1. A precision inclinometer comprising a housing, bearings mounted on opposite ends of said housing, each of said bearings having a least two ball bearing races of one which is movable, a shaft rotatably mounted in said bearings, a pendulum wheel mounted on said shaft, a plurality of permanent magnets fixed to a movable race of said bearings, a plurality of series connected coils fixed to said housing and adjacent said plurality of permanent magnets, means applying an A.C. signal to said series connected coils for producing an alternating magnetic field, whereby the interaction between the magnetic fields of said coils and permanent magnets causes said last mentioned race to rapidly oscillate.

2. The device of claim 1 wherein adjacent magnets of said plurality of permanent magnets are of opposite polarity and each of said coils is aligned between adjacent magnets.

3. The device of claim 2 wherein the torque applied to said last mentioned race by said interacting magnetic fields is slightly greater than the starting torque of said bearings.

4. A precision inclinometer comprising a housing, first and second bearings mounted on opposite ends of said housing, a shaft mounted in said bearings, each of said bearings including an outer race fixed to said housing, an inner race formed in said shaft and a plurality of balls disposed between said inner and outer races, a pendulum wheel including an unbalanced mass and an outer bearing race, said pendulum wheel rotatably mounted on a plurality of balls disposed between said pendulum outer bearing race and an inner race formed in said shaft, a capacitor plate mounted on said pendulum wheel, another capacitor plate mounted on said housing adjacent said first mentioned capacitor plate, a plurality of series connected coil circumferentially disposed about the outer race of said first bearing, a circular armature including a plurality of permanent magnets disposed in the outer periphery thereof and having adjacent alternate poles, said circular armature being fixedly attached to said shaft with the outer periphery being adjacent said plurality of series connected coils, means applying an A.C. signal to said series connected coils for producing an alternating magnetic field, whereby the interaction between the magnetic fields of the coils and permanent magnets causes the armature and shaft to rapidly oscillate thereby overcoming the starting torque of said bearings.

5. The device of claim 4 wherein the torque applied to said armature by said interacting magnetic fields is slightly greater than the starting torque of said bearings.

6. A precision inclinometer comprising a housing, first and second bearings mounted on opposite ends of said housing, each of said bearings including an outer race, a center race and an inner race with a plurality of balls disposed between said outer and center races and between said inner and center races, a shaft mounted in said inner race of each bearing, a pendulum wheel fixedly attached to said shaft and including an unbalanced mass and a capacitor plate, another capacitor plate mounted on said housing adjacent said capacitor plate, one side of the center race of each of said bearing races having a plurality of spaced apart permanent magnets with adjacent polarities being of opposite signs, a plurality of series connected coils fixed to said housing and positioned adjacent each of said spaced apart permanent magnets, means applying an A.C. signal to said series connected coils for producing an alternately changing magnetic field whereby the interaction between the magnetic fields of the coils and spaced apart permanent magnets causes said center races to rapidly oscillate thereby overcoming the starting torque of said bearings.

7. A device of the character described, a pendulum member, a shaft supporting said member, bearings on the ends of said shaft, said bearings mounted in a housing and rotatably supporting said shaft, each of said bearings comprising a plurality of ball bearing races at least one of which is movable, means attached to at least one of said movable ball bearing races for producing a magnetic field, and means fixed on said housing adjacent said first-named means for producing a magnetic field which interacts with said first-named magnetic field, one of said magnetic fields alternately changing in polarity for causing rapid oscillation of said movable ball bearing race.

8. The device of claim 7, wherein one of said means for producing a magnetic field comprises a permanent magnet.

9. The device of claim 8, wherein the other of said means for producing a magnetic field comprises a plurality of series connected coils through which alternating current flows.

References Cited in the file of this patent

UNITED STATES PATENTS

| | | |
|---|---|---|
| 1,452,485 | Tanner | Apr. 17, 1923 |
| 1,999,215 | Smith | Apr. 30, 1935 |

UNITED STATES PATENT OFFICE
CERTIFICATE OF CORRECTION

Patent No. 3,059,343                          October 23, 1962

David W. Kermode

It is hereby certified that error appears in the above numbered patent requiring correction and that the said Letters Patent should read as corrected below.

Column 3, lines 50 and 51, for "having a least two ball bearing races of one which is movable" read -- having at least two ball bearing races one of which is movable --.

Signed and sealed this 7th day of May 1963.

(SEAL)
Attest:

ERNEST W. SWIDER
Attesting Officer

DAVID L. LADD
Commissioner of Paten